(12) United States Patent
Jung et al.

(10) Patent No.: US 10,554,861 B2
(45) Date of Patent: Feb. 4, 2020

(54) METHOD AND DEVICE FOR COLOR COMPENSATION

(71) Applicant: HP PRINTING KOREA CO., LTD., Suwon-si, Gyeonggi-Do (KR)

(72) Inventors: Joo-young Jung, Suwon-si (KR); Hyung-jong Kang, Seoul (KR); Kyeong-man Kim, Yongin-si (KR); Jeong-hun Kim, Hwaseong-si (KR); Nam-ju Shin, Suwon-si (KR); Ho-jin Ahn, Suwon-si (KR); Hyun-soo Oh, Suwon-si (KR); Woo-jun Chung, Suwon-si (KR); Jung-mo Hong, Suwon-si (KR); In-ho Park, Yongin-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 15/058,260

(22) Filed: Mar. 2, 2016

(65) Prior Publication Data
US 2016/0261775 A1  Sep. 8, 2016

Related U.S. Application Data

(60) Provisional application No. 62/128,561, filed on Mar. 5, 2015.

(30) Foreign Application Priority Data

Sep. 1, 2015 (KR) .......................... 10-2015-0123655

(51) Int. Cl.
*H04N 1/60* (2006.01)
*H04N 1/00* (2006.01)

(52) U.S. Cl.
CPC ......... *H04N 1/6055* (2013.01); *H04N 1/6033* (2013.01); *H04N 1/6036* (2013.01)

(58) Field of Classification Search
None
See application file for complete search history.

(56) References Cited

U.S. PATENT DOCUMENTS

| 8,018,620 | B2 | 9/2011 | Jung |
| 8,422,077 | B2 | 4/2013 | Jung |
| 8,955,034 | B2 | 3/2015 | Park et al. |

(Continued)

FOREIGN PATENT DOCUMENTS

| JP | 11-252392 | 9/1999 |
| KR | 10-2007-0121181 | 12/2007 |

(Continued)

*Primary Examiner* — Helen Zong
(74) *Attorney, Agent, or Firm* — Staas & Halsey LLP

(57) ABSTRACT

Provided is a color compensation method in an image forming apparatus. The color compensation method may include imaging a first color chart by a first image forming apparatus, scanning the imaged first color chart, comparing information regarding the scanned first color chart and information regarding a reference color chart to determine an international color consortium (ICC) profile of the first image forming apparatus, and performing color compensation on the first image forming apparatus based on the determined ICC profile.

16 Claims, 15 Drawing Sheets

(56) References Cited

U.S. PATENT DOCUMENTS

| | | | |
|---|---|---|---|
| 9,098,792 B2 | 8/2015 | Shin et al. | |
| 2004/0190022 A1* | 9/2004 | Kiyohara | H04N 1/6055 |
| | | | 358/1.9 |
| 2008/0043265 A1 | 2/2008 | Kim et al. | |
| 2013/0250322 A1* | 9/2013 | Kawabata | H04N 1/60 |
| | | | 358/1.9 |
| 2013/0321514 A1* | 12/2013 | Pous | B41J 29/393 |
| | | | 347/19 |
| 2014/0168674 A1* | 6/2014 | Shin | H04N 1/6055 |
| | | | 358/1.9 |
| 2014/0313529 A1* | 10/2014 | Nakashio | G06K 15/027 |
| | | | 358/1.9 |
| 2016/0134782 A1* | 5/2016 | Yamamuro | H04N 1/605 |
| | | | 358/1.9 |
| 2016/0191750 A1* | 6/2016 | Chung | G03G 15/5062 |
| | | | 358/3.23 |

FOREIGN PATENT DOCUMENTS

| | | |
|---|---|---|
| KR | 10-2012-0140177 | 12/2012 |
| KR | 10-2014-0076900 | 6/2014 |

* cited by examiner

FIG. 6

| szName | szDevicePath | szIOType |
|---|---|---|
| ☐ M458x Series | 10,88,194,148 | Netwoek |
| ☐ M458x Series | 10,88,193,185 | Netwoek |
| ☐ M408x Series | 10,88,193,244 | Netwoek |
| ☐ M4300 Series | 10,88,193,34 | Netwoek |
| ☐ M408x Series | 10,88,193,241 | Netwoek |
| ☐ M408x Series | 10,88,194,57 | Netwoek |
| ☐ C268x Series | 10,88,197,140 | Netwoek |
| ☐ CLX-9252 9352 Series | 10,88,193,179 | Netwoek |
| ☐ X4300 Series | 10,88,194,219 | Netwoek |
| ☐ X7600 Series | 10,88,197,153 | Netwoek |
| ☐ C268x Series | 10,88,193,195 | Netwoek |
| ☐ K3250 Series | 10,88,194,186 | Netwoek |
| ☐ C268x Series | 10,88,194,251 | Netwoek |
| ☐ X3220 Series | 10,88,194,201 | Netwoek |
| ☐ K7600 Series | 10,88,192,38 | Netwoek |
| ☐ CLX-9252 9352 Series | 10,88,194,173 | Netwoek |
| ☐ C268x Series | 10,88,194,82 | Netwoek |
| ☐ X7600 Series | 10,88,193,182 | Netwoek |

METHOD AND DEVICE FOR COLOR COMPENSATION

CROSS-REFERENCE TO RELATED APPLICATIONS

This application claims the benefit of U.S. Provisional Application No. 62/128,561, filed on Mar. 5, 2015, in the US Patent Office and Korean Patent Application No. 10-2015-0123655, filed on Sep. 1, 2015, in the Korean Intellectual Property Office, the disclosures of which are incorporated herein in their entireties by reference.

BACKGROUND

1. Field

One or more embodiments of the present disclosure relate to a method and device for color compensation, and more particularly, to a color compensation method and device in which a user may output a desired color in an image forming apparatus.

2. Description of the Related Art

Image forming apparatuses, such as printers, may have different output colors depending on an image forming type (e.g., ink, laser, etc.), a model, a manufacturer, or the like. Since image forming apparatuses may have different physical properties, such as a toner, or policies depending on the manufacturer, there may be a color difference, etc. between printouts. Even when image forming apparatuses have the same model, there may be a color difference between printouts depending on a management environment (e.g., temperature, humidity, etc.) or a period of use.

In addition, a user may desire to output a printout with attributes, such as a color, of image forming apparatus B from image forming apparatus A. For example, when the user desires to use a color tone of image forming apparatus B in image formation apparatus A, color compensation is required, and thus the user may not easily perform the color compensation.

Accordingly, in order to output a color with a tone suitable for the user's taste, a color compensation method of an image forming apparatus may have to be provided conveniently for the user. In this disclosure, a convenient method for the user is provided, as compared to a conventional color compensation method.

Conventionally, in order to perform color compensation on the image forming apparatus, an international color consortium (ICC) profile is created with a colorimeter. The color compensation may be performed by measuring the color of the printout, which is output from an image forming apparatus, with the colorimeter, creating the ICC profile on the basis of a result of measuring the color, and applying the created ICC profile to the image forming apparatus. However, in this case, the purchase or use of an expensive colorimeter by a user may act as a significant burden. Inconveniently, a method of using control software of the colorimeter and a method of performing color compensation are not easily provided to general consumers.

In order to overcome the inconvenience, a manufacture provides a chart of a hardcopy that is output with standard colors as a method using a scanner. Thus, an ICC profile may be determined on the basis of Red-Green-Blue (RGB) values of image information obtained by scanning a hardcopy provided by a manufacturer. However, in this method, since a user should have the hardcopy, the user should receive the hardcopy upon the purchase of the image forming apparatus or by mail. In addition, when the hardcopy is carelessly managed, the hardcopy may be lost, damaged, and contaminated, and thus an undesired color may be obtained through the color compensation.

As described above, the conventional color compensation method has a problem in that it is difficult to maintain an initial state of the image forming apparatus for various reasons. Thus, a function of allowing a user to autonomously calibrate the state of the image forming apparatus is required to be improved. Accordingly, the present disclosure presents improved color compensation method.

SUMMARY

Provided is a method of comparing a color chart of an image forming apparatus and a reference color chart, determining an international color consortium (ICC) profile to be applied to the image forming apparatus, and performing color compensation on the image forming apparatus through the determined ICC profile.

Provided is also a color compensation method that allows a user having no professional equipment or software to easily reproduce a color of another printer.

Additional aspects will be set forth in part in the description which follows and, in part, will be apparent from the description, or may be learned by practice of the presented exemplary embodiments.

According to an aspect of an exemplary embodiment, a color compensation method includes imaging a first color chart by a first image forming apparatus, scanning the imaged first color chart, comparing information regarding the scanned first color chart and information regarding a reference color chart to determine an international color consortium (ICC) profile of the first image forming apparatus, and performing color compensation on the first image forming apparatus based on the determined ICC profile.

The reference color chart may be a predefined color chart that is selected by a user of the first image forming apparatus.

The reference color chart may be a color chart imaged by a second image forming apparatus.

The information regarding the reference color chart may be information obtained by the first image forming apparatus scanning the reference color chart.

The comparing of the information regarding the scanned first color chart and the information regarding the reference color chart may include comparing an attribute of the first color chart and an attribute of the reference color chart.

The attribute of the first color chart and the attribute of the reference color chart may include one or more of tone, chroma, and brightness.

The comparing of the information regarding the scanned first color chart and the information regarding the reference color chart may include transforming RGB values of the first color chart and the reference color chart at a predefined position into another color coordinate system and performing color information comparison on the transformed color coordinate system.

The color compensation method may further include storing the information regarding the first color chart and the information regarding the reference color chart.

The determining of the ICC profile may include removing an ICC profile that is outside a certain range from among a plurality of prestored ICC profiles and determining an ICC profile having an attribute that is within a certain range with respect to the reference color chart.

According to an aspect of another exemplary embodiment, a color compensation method using a mobile device includes identifying a first printer needing color compensation, receiving information regarding a second printer that is a reference for the color compensation, transmitting color coordinate system information to the first printer and the second printer, receiving first color coordinate system image information output from the first printer and second color coordinate system image information output from the second printer, comparing the received first color coordinate system image information and second color coordinate system image information to determine a color compensation value, and transmitting the determined color compensation value to the first printer.

The receiving of the first color coordinate system image information output from the first printer and the second color coordinate system image information output from the second printer may include using an image sensor of the mobile device to capture the first color coordinate system image and the second color coordinate system image.

The receiving of the first color coordinate system image information output from the first printer and the second color coordinate system image information output from the second printer may include receiving information regarding the first color coordinate system image and the second color coordinate system image, which are scanned by a scanner.

The reference color chart may be a color chart imaged by a second image forming apparatus distinct from the image forming apparatus.

The information regarding the reference color chart may be information obtained by the image forming apparatus scanning the reference color chart.

When comparing the information regarding the scanned first color chart and the information regarding the reference color chart, the controller may compare an attribute of the first color chart and an attribute of the reference color chart.

The attribute of the first color chart and the attribute of the reference color chart may include one or more of tone, chroma, and brightness.

When comparing the information regarding the scanned first color chart and the information regarding the reference color chart, the controller may transform RGB values of the first color chart and the reference color chart at a predefined position into another color coordinate system and perform color information comparison on the transformed color coordinate system.

The image forming apparatus may further include a storage unit configured to store the information regarding the first color chart and the information regarding the reference color chart.

The controller may remove an ICC profile that is outside a certain range from among a plurality of prestored ICC profiles and then determine an ICC profile having an attribute that is within a certain range with respect to the reference color chart.

According to an aspect of another exemplary embodiment, a mobile device includes a controller configured to identify a first printer needing color compensation and compare received first color coordinate system image information and second color coordinate system image information to determine a color compensation value, a communication unit configured to transmit a discovery packet to identify the first printer, receive information regarding a second printer that is a reference for the color compensation, transmit color coordinate system information to the first printer and the second printer, receive first color coordinate system image information output from the first printer and second color coordinate system image information output from the second printer, and transmit the determined color compensation value to the first printer, and a camera unit configured to capture the first color coordinate system image information output from the first printer and the second color coordinate system image information output from the second printer.

According to an aspect of another exemplary embodiment, a color compensation method may include generating, using an image forming apparatus, a color chart that includes a specific color in a specific position of the color chart, scanning, using a hardware-based scanner, the color chart that includes the specific color in the specific position of the color chart and a reference color chart to acquire color chart information and reference color chart information, respectively, and comparing, by way of a hardware-based processor, the acquired color chart information and reference color chart information to determine a difference between the color chart and the reference color chart.

BRIEF DESCRIPTION OF THE DRAWINGS

These and/or other aspects will become apparent and more readily appreciated from the following description of the exemplary embodiments, taken in conjunction with the accompanying drawings in which:

FIG. 6 is a diagram showing an example of a printer color table according to an embodiment of the present disclosure;

DETAILED DESCRIPTION

Figure 1:
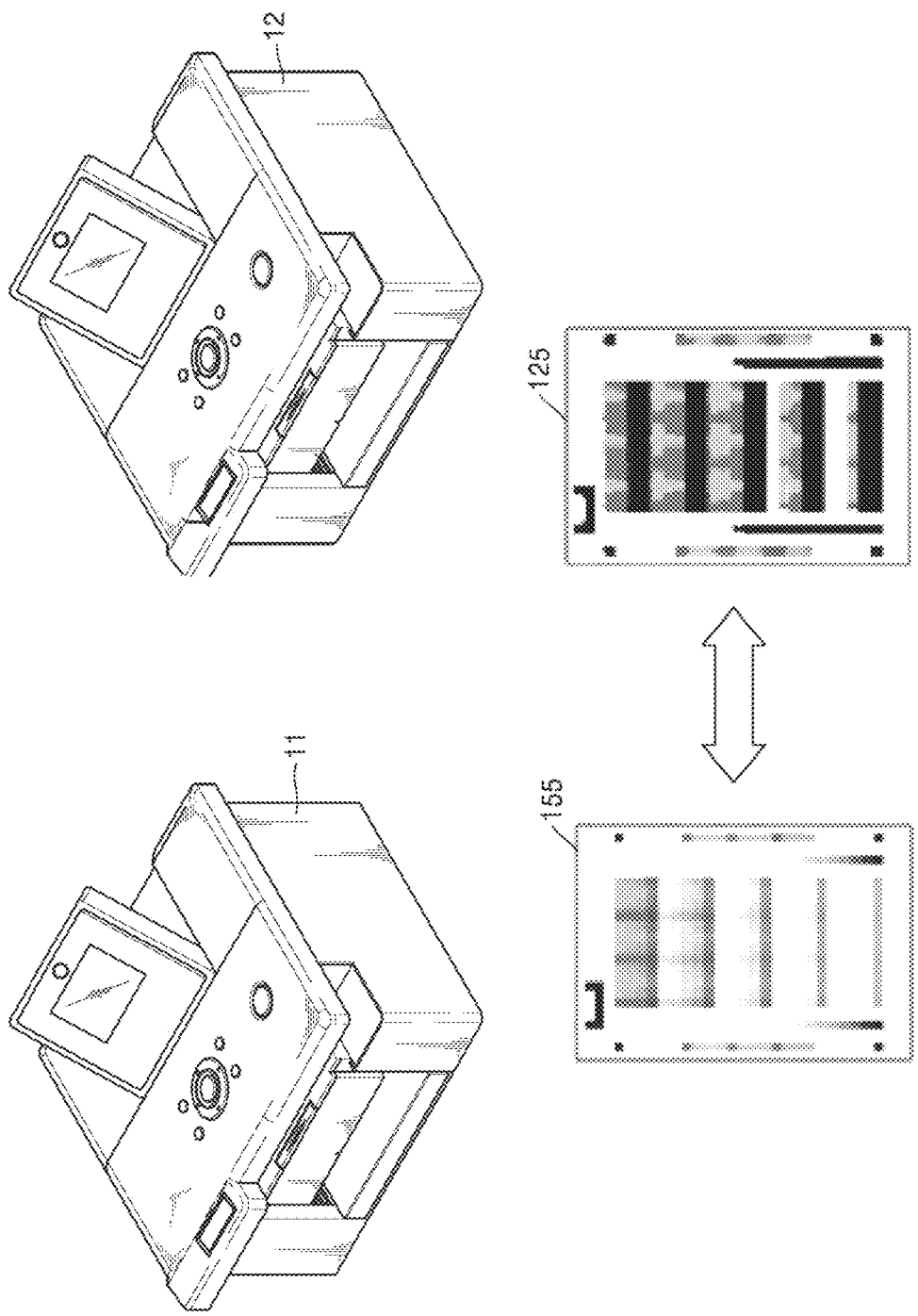
FIG. 1 is a diagram for describing an example in which color compensation is necessary according to an embodiment of the present disclosure.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Terms used herein will be briefly described, and the exemplary embodiments will be described in detail.

Terms used in the exemplary embodiments have been selected as general terms which are widely used at present, in consideration of the functions of the exemplary embodiments, but may be altered according to the intent of an operator skilled in the art, conventional practice, or introduction of new technology. Also, if there is a term which is arbitrarily selected by the applicant in a specific case, in this case, a meaning of the term will be described in detail in a corresponding description portion of the exemplary embodiments. Therefore, the terms should be defined on the basis of the entire content of this specification instead of a simple name of each of the terms.

In this disclosure below, when it is described that one comprises (or includes or has) some elements, it should be understood that it may comprise (or include or have) only those elements, or it may comprise (or include or have) other elements as well as those elements if there is no specific limitation. Moreover, each of terms such as "unit" and "module" described in the specification denotes an element for performing at least one function or operation, and may be implemented in hardware, software or the combination of hardware and software.

In the following detailed description, only certain exemplary embodiments of the present disclosure have been shown and described, simply by way of illustration. The exemplary embodiments may, however, be embodied in many different forms and should not be construed as being limited to the embodiments set forth herein. In the accompanying drawings, portions irrelevant to a description of the exemplary embodiments will be omitted for clarity. Moreover, like reference numerals refer to like elements throughout.

In this disclosure, when one part (or element, device, etc.) is referred to as being "connected" to another part (or element, device, etc.), it should be understood that the former can be "directly connected" to the latter, or "electrically connected" to the latter via an intervening part (or element, device, etc.) Furthermore, when one part is referred to as "comprising (or including or having)" other elements, it should be understood that it can comprise (or include or have) only those elements, or other elements as well as those elements unless specifically described otherwise.

Also, the term "device" may be used interchangeably with the term "equipment" or "apparatus," and the terms "device," "equipment," and "apparatus" may be described by the same representation.

Herein, equipment information on a device is information regarding the device and attributes of the device, and may include information regarding an identification value of the device, a type of the device, a type and an attribute of sensing data that is sensed by the device, and a sensing period of the device.

Herein, a service may include various services that may be performed by a device. The service may include a service based on communication with a server or another device and a service operable in the device. It will be widely understood that the service applied to the present disclosure includes various services that may be performed by the device, in addition to a service described in the present disclosure as an example.

The technique disclosed in this specification may be applied to all fields in which communication between equipments is allowed. It would be obvious to those skilled in the art that the technique may be applied when the communication between the equipments is allowed such as in an Internet of Things (IoT), a ubiquitous service, a smart home, and a connected car service.

Hereinafter, embodiments of the present disclosure will be described in detail with reference to the accompanying drawings.

FIG. 1 is a diagram for describing an example in which color compensation is necessary according to an embodiment of the present disclosure. It is assumed that image forming apparatus A 11 of FIG. 1 may output color printout A155, and image forming apparatus B 12 may output color printout B 125. As an example, image forming apparatus A11 and image forming apparatus B 12 may be embodied as a printer or a multifunction peripheral (MFP). The MFP may include, among other features, a printer and a scanner combined physically into a single device and thus may be configured to scan a printout output from any image forming apparatus.

When an image forming apparatus outputs a color printout, the color of the output color printout may change with respect to an identical-color output command for various reasons. For example, when an image forming apparatus such as a printer is used for a long time, a color of a printout that is output from one image forming apparatus may change due to a temporal factor such as a consumption of internal components or a change in an engine state.

Also, the color of the color printout may change due to a spatial environment of the image forming apparatus. For example, image forming apparatus A 11 may be located in hot and humid weather while image forming apparatus B 12 may be located in cold and dry weather. In this case, even when the image forming apparatuses are the same model, the colors of the output printouts may be different from each other.

When a different color is output with respect to an identical-color command, the accuracy and reliability of the printout may be reduced, and thus the color is needed to be restored to a reference color through the color compensation.

The color compensation may be required for another reason other than dealing with the color change due to the temporal or spatial factor. The color may need to be changed to a tone preferred by the user of the image forming apparatus. For example, when the user prefers reddish colors, the color compensation for increasing chroma or decreasing brightness may be needed to further deepen the reddish colors.

Also, when the user replaces the image forming apparatus, the user may desire to output a color having a tone of an old image forming apparatus, and thus the color compensation may be performed on a new image forming apparatus to obtain the tone of the old image forming apparatus with the new image forming apparatus. Alternatively, the color compensation may be required when a tone of a printout output from another image forming apparatus is applied to the image forming apparatus of the user.

Accordingly, as the color compensation is required, various color compensation methods are being introduced. As the most intuitive color compensation method, there is a method of directly measuring the color of the printout of the image forming apparatus with a colorimeter to perform the color compensation. The above color compensation method is the most intuitive and accurate method. However, since the colorimeter is expensive, it is not easy for a general user to buy or borrow the colorimeter. Furthermore, technical expertise is required for a general user to use software for using the colorimeter and color compensation software, and thus the user may not be provided with convenience.

In order to solve such problems of the colorimeter, manufacturers have proposed a color compensation method using a scanner. However, when a printout is scanned with the scanner, a reference color chart is needed to compensate for the difference. Accordingly, each manufacture provides the reference color chart by directly providing a hardcopy of the reference color chart when the user purchases the image forming apparatus or sending the hardcopy via mail upon the user's request.

However, a conventional color compensation method using the hardcopy of the reference color chart do not often provide convenience to the user because the reference color chart may be lost, damaged, and contaminated because of careless management, the color of the hardcopy itself may change, and there are spatial and temporal limitations in receiving the hardcopy from the manufacture again.

In order to solve the above-described problems, a method of performing color compensation on a printer without an expensive colorimeter or a hardcopy of a reference color chart will be described below.

Figure 2:
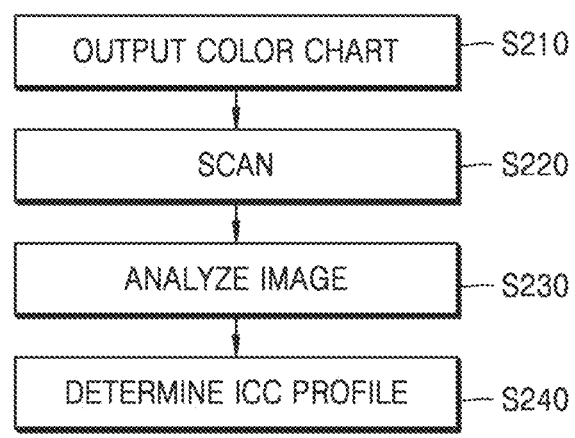
FIG. 2 is a flowchart showing a color compensation process according to an embodiment of the present disclosure.

FIG. 2 is a flowchart showing a color compensation process according to an embodiment of the present disclosure.

A color compensation method proposed in the present disclosure is a color duplication method, which may denote a method of applying an international color consortium (ICC) profile of a reference color to an image forming apparatus. The following description assumes that the color duplication method may largely include four operations of outputting a color chart, scanning the color chart, analyzing an image, and determining an ICC profile.

First, in S210, a user may give a command to output a color of an image forming apparatus in order to perform color compensation on the image forming apparatus. The image forming apparatus may output a first color chart upon receiving the color output command. Here, the first color chart may be a predefined format of color chart. The predefined format of color chart may denote a color chart that is previously determined to output a specific color in a specific position of a printout.

In S220, the user may use a scanner, e.g., of the image forming apparatus, to scan the color chart. Here, there are two types of color charts to be scanned. One color chart may be the first color chart which is output in S210, that is, which is output by an image forming apparatus that needs color compensation.

The scanner may scan a reference color chart in addition to the first color chart. The reference color chart may be provided by a standard association or a specific manufacturer or group. For example, manufacturer A may allow its image forming apparatus to output an ICC profile, which is a color reference, as the reference color chart.

Alternatively, the reference color chart may be a color chart selected according to the user's preference. For example, the user may choose a specific color chart as the reference color chart and may desire to apply colors of the color chart to colors of the image forming apparatus.

The scanner may scan the first color chart and the reference color chart to acquire first color chart image information and reference color chart image information. The scanner may deliver the first color chart image information and the reference color chart image information to a controller.

In S230, the controller of the image forming apparatus may compare the acquired first color chart image information and reference color chart image information. Since the specific color is output to the specific position in the predefined color chart, the controller may compare the two charts on the basis of this format.

The controller may convert a color difference into data and may determine which color has a difference and how much the difference is on the basis of the difference data.

The scanned first color chart image information and reference color chart image information may be represented as colors that are defined on a Red-Green-Blue (RGB) color coordinate system. In the RGB color coordinate system, a difference between color values of the two charts may be determined.

In this disclosure, a difference between colors may be determined on various color coordinate systems other than the RGB color coordinate system. For example, in an Hue-Saturation-Value (HSV) color coordinate system (or color space), a color coordinate system may be positioned based on color (hue), chroma (saturation), and brightness (value) to determine degrees of color, chroma, and brightness. It would be obvious that the color difference may be determined by comparing color values on various color coordinate systems such as a Cyan-Magenta-Yellow-Key (CMYK) color coordinate system (color space).

In S240, the controller may compare the first color chart image information and the reference color image information to determine an ICC profile to be applied to a first image forming apparatus. The ICC profile is a profile that is used in a color management system conforming to an ICC specification and that is used in a monitor, a printer, etc. The ICC profile is a specification for precisely and consistently managing colors of color printouts output from numerous image forming apparatuses and may be provided in consideration of print conditions, such as a sheet type, an ink type, or a toner type, when the ICC profile is created.

There may be various methods of determining the ICC profile. In the present disclosure, as an example, an ICC profile outside a certain range may be removed from a plurality of ICC profiles. When an ICC profile has a large color difference, the ICC profile may be removed preferentially in order to reduce the amount of calculation of the controller because there is a significantly low probability that the ICC profile will be determined by the controller as a new ICC profile.

The controller may determine an ICC profile that is the most similar to the reference color chart from among ICC profiles other than the preferentially removed ICC profiles, that is, from among the filtered ICC profiles.

The ICC profile determined by the controller is applied to the image forming apparatus as a new ICC profile of the image forming apparatus, and thus may be corrected to be a color value significantly similar to the reference color chart (color duplication).

Figure 3:
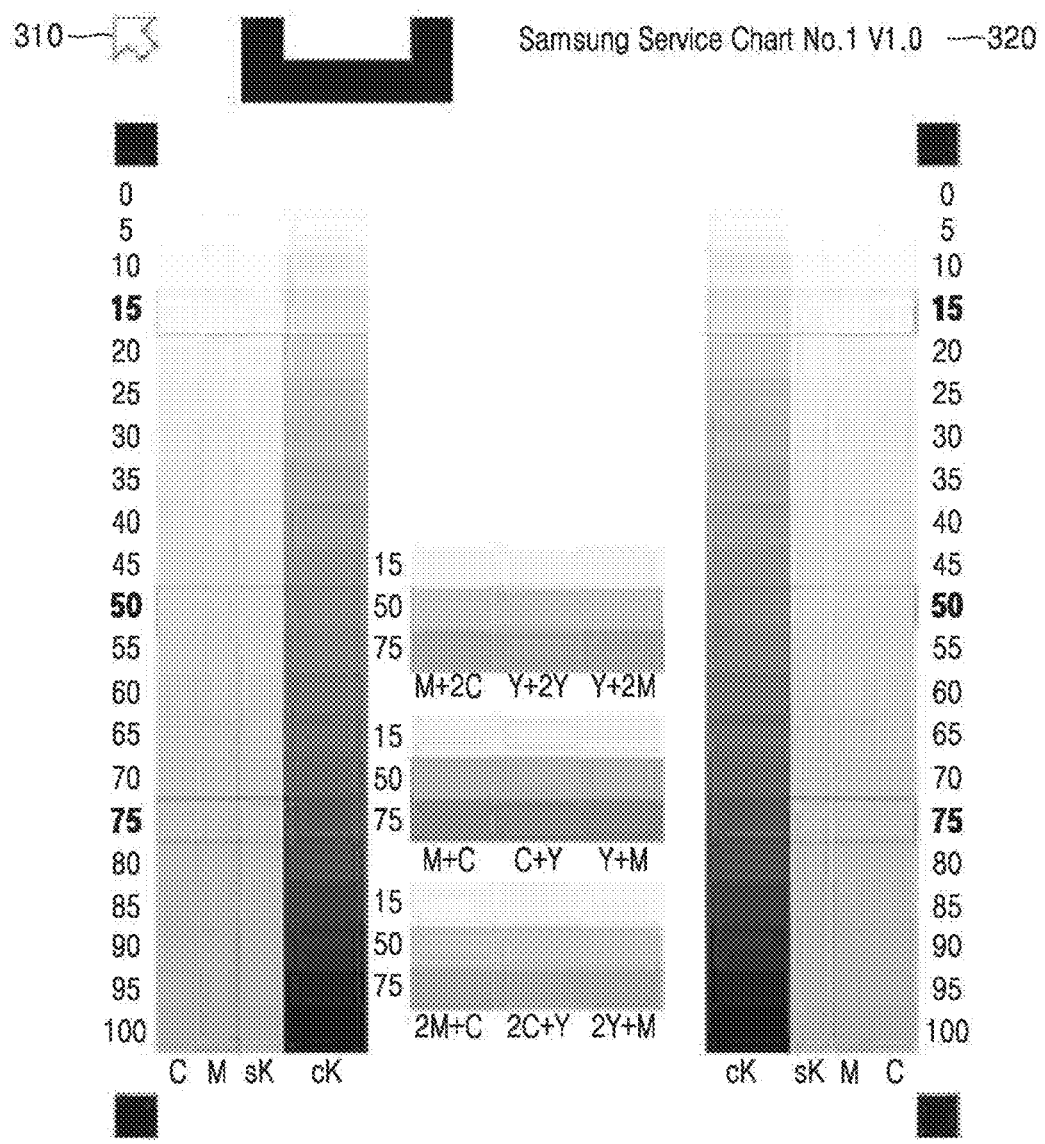
FIG. 3 is a diagram showing an example of a color chart according to an embodiment of the present disclosure.

FIG. 3 is a diagram showing an example of a color chart according to an embodiment of the present disclosure.

In the present disclosure, the color chart may be predetermined by an association or manufacturer.

The color chart may include information indicating a direction of the color chart, and positions and values of colors may be determined based on the information. For example, an arrow 310 is displayed at an upper left corner of the color chart to indicate a scanning direction. Accordingly, since it can be assumed that the same color is displayed at the same position, a color difference may be determined accurately.

The color chart displays various color values in various levels of chroma. For example, CMYK colors, that is, colors of cyan, magenta, yellow, and black may be displayed in units of a predetermined level of chroma. As shown in FIG. 3, in the color chart, a black value may also be separately displayed as two colors sK and cK.

Also, in the color chart, a color obtained by mixing specific colors may be displayed together. For example, a color of M+2C, which is obtained by mixing the color of magenta (M) and the color of cyan (C) at a ratio of 1:2, may be displayed for each degree of chroma. The color chart may display various other colors and mixings in a predetermined method and may be used as a comparative color chart.

In FIG. 3, an information value (e.g., Samsung Service Chart No.1 V1.0) of the color chart may be identifiably displayed at an upper right corner 320. However, in the present disclosure, color chart identification information is not limited to the method shown in FIG. 3. It should be noted that an identifier may be displayed variously with various images, barcodes, QR codes, or RFIDs other than the text.

Figure 4:
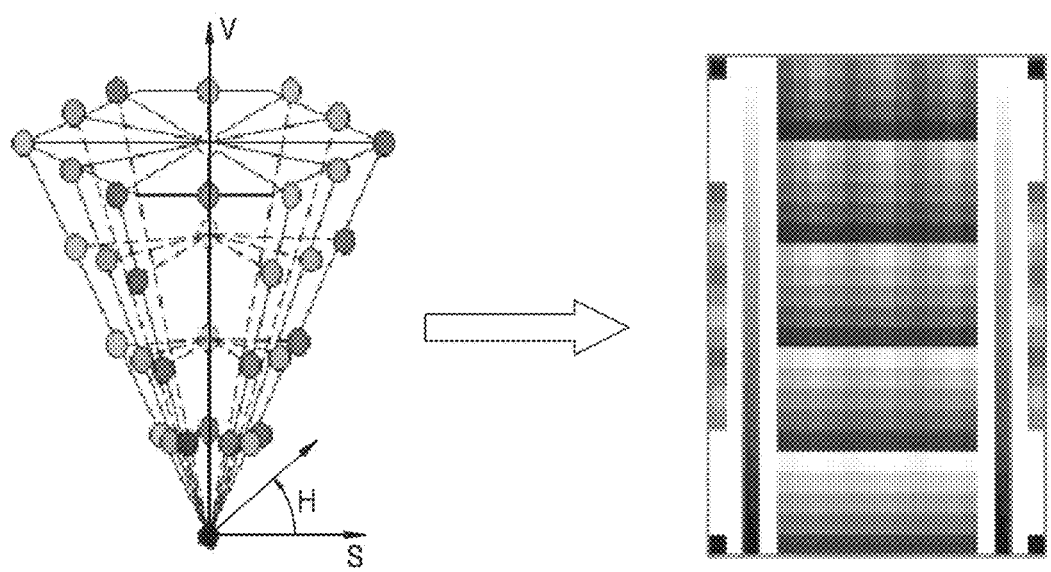
FIG. 4 is a diagram illustrating a Hue-Saturation-Value (HSV) color coordinate system representing colors according to an embodiment of the present disclosure.

FIG. 4 is a diagram illustrating an HSV color coordinate system representing colors according to an embodiment of the present disclosure.

A controller may process scanned image information in various color spaces. In the present disclosure, an example will be described in which the scanned image is in a coordinate system represented in the RGB color coordinate system, and the controller transforms the RGB color coordinate system into the HSV color coordinate system and determines a color difference on the HSV color coordinate system. However, the color coordinate system or color space is not limited thereto, and thus may be a color coordinate system or color space in which the controller may efficiently process the color difference.

The HSV color coordinate system is one method of representing colors, in which the colors are arranged according to a predetermined method.

In the HSVE color coordinate system, as a simple description, there are largely three kinds of axes. In a color (hue) axis, a visible light spectrum is positioned in the shape of a ring in a counter-clockwise direction, in which 0 degrees of color indicates a red color.

A chroma (saturation) axis indicates a degree indicating whether a color is deep or shallow in the same brightness. 0% chroma indicates achromatic colors (e.g., white, gray, and black) while 100% chroma indicates pure colors. With respect to a V axis, the chroma increases in a direction away from the V axis.

Brightness (value) is a degree of lightness, and 0% brightness indicates only black. Accordingly, in the HSV color coordinate system, as shown in FIG. 4, when a brightness value (V) is lowest, the brightness value (V) may be represented as a black point. As the brightness value (V) increases, colors brighten. Accordingly, the colors may be represented in the shape of, for example, a circular cone. Alternatively, the colors may be represented in the shape of a circular cylinder. In this case, a bottom surface of the circular cylinder may be represented as black.

The controller according to an embodiment of the present disclosure may transform image information of the scanned color chart into color values on the above-described HSV color coordinate system and may determine a color difference.

Figure 5:
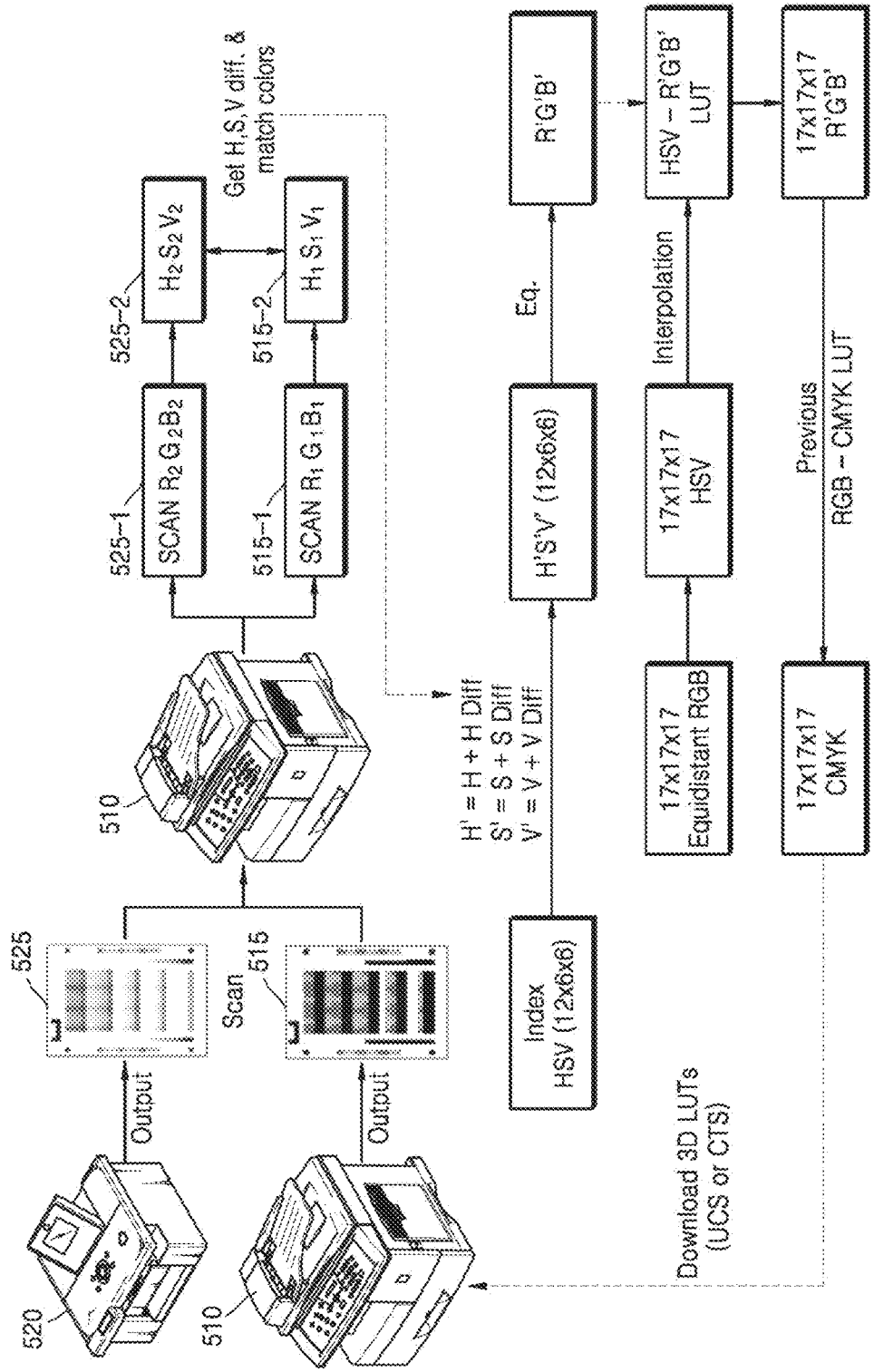
FIG. 5 is a flowchart showing a color compensation process according to an embodiment of the present disclosure.

FIG. 5 is a flowchart showing a color compensation process according to an embodiment of the present disclosure.

As shown in FIG. 5, when color compensation is performed on a first image forming apparatus 510, the color compensation may be performed on the basis of reference color values of a second image forming apparatus 520. For example, a user may perform the color compensation in order to duplicate a color tone of a previously used second image forming apparatus to a newly purchased first image forming apparatus. As another example, since the user prefers a color of a printout output by the second image forming apparatus 520, the user may perform the color compensation to apply the color to the first image forming apparatus 510.

Here, the first image forming apparatus and the second image forming apparatus may include a printer or a multi-function peripheral (MFP). The MFP has a printer and a scanner combined physically and thus may scan a printout output from the first image forming apparatus again.

In the present disclosure, it is assumed that an ICC profile of the first image forming apparatus 510 is determined on the basis of a reference color chart 525 output from the second image forming apparatus 520. The image forming apparatus 510 may also output a first color chart 515 that may represent a color state of the first image forming apparatus 510.

The scanner of the first image forming apparatus 510 may scan the first color chart 515 and the reference color chart 525 to transform the charts into processable image information.

In a method of scanning the first color chart 515 and the reference color chart 525, a method of providing convenience to a user will be described. In general, a scanner user may confuse a direction of a sheet (landscape or portrait) and have difficulty in recognizing a right, left, top, and bottom of the sheet. After the scanning, the scanner user may rotate or reverse the scanned image to acquire an image scanned in a forward direction.

In a scanning method proposed in the present disclosure, the controller senses the direction of the sheet using identification information of a color chart to be scanned, and rotates the image to the forward direction.

For example, on a condition that the user uses the scanner, when the user positions the first color chart 515 in a lateral direction (landscape) and gives a scanning command, the controller may rotate image information of the first color chart 515 to the forward direction (longitudinal direction) by identifying identification information (e.g., a text or image) of the first color chart 515 from the acquired image.

In addition, the identification information may be utilized according to a scanning range of the scanner of the first image forming apparatus 510. An office image forming apparatus has a scanning range of A3 or greater on the basis of a sheet size, and thus may scan a first color chart 515 and a reference color chart 525 that are output using an A4 sheet at one time. However, a home image forming apparatus has a scanning range of A4 and thus may have a limitation in that the first color chart 515 and the reference color chart 525 cannot be scanned at one time.

In this case, the controller may determine which color chart is a reference color chart by using the identification information of the scanned image, irrespective of an order of the scanning process, to identify the scanned color chart.

On a condition that the above-described method is efficiently provided to a user, when the office image forming apparatus scans two color charts at the same time, conversion into forward-direction color chart image information may be performed irrespective of an arrangement direction of a sheet.

Image information of the scanned color chart may be represented with RGB colors, image information of the first color chart 515 may be represented with R1G1B1, and image information of the reference color chart 525 may be represented with R2G2B2.

Upon receiving the image information of the first color chart 515 and the image information of the reference color chart 525 from the scanner, the controller may transform RGB colors into HSV colors. For example, R1 G1 B1 for the image information of the first color chart may be transformed into H1S1V1, and R2G2B2 for the image information of the reference color chart may be transformed into H2S2V2.

The controller may compare an H1S1V1 color and an H2S2V2 color to acquire a difference between the colors. The color difference may be separately determined as a color difference (H Diff), a chroma difference (S Diff), and a brightness difference (V Diff).

The controller may determine the color difference (H Diff), the chroma difference (S Diff), and the brightness difference (V Diff), and may determine new H'S'V' color values for the colors of the first image forming apparatus on the basis of the determined differences.

The controller may transform the new H'S'V' color values into R'G'B' values. This may be understood as an inverse transformation of the transformation from the previous RGB color coordinate system into the HSV color coordinate system.

The controller may determine a value matched in a lookup table (LUT) on the basis of the R'G'B' values. Subsequently, the controller may transform the value into a value on a CMYK color coordinate system to apply the value into a color ICC profile of the first image forming apparatus 510.

FIG. 6 is a diagram showing an example of a printer color table according to an embodiment of the present disclosure.

As described above in FIG. 5, a first image forming apparatus may compensate for colors on the basis of a difference between the colors and may store the colors. Accordingly, the colors may also be applied to a plurality of image forming apparatuses.

As shown in FIG. 6, since image forming apparatuses may have respective unique ICC profiles, the controller may acquire the ICC profiles of the image forming apparatuses. As a method for the acquisition, the ICC profiles of the image forming apparatuses may be received through a network search or prestored in a storage unit of an image forming apparatus, and may be acquired through various routes stored in a server, etc.

The controller may calculate an ICC profile value corrected for each model or for each image forming apparatus to collectively generate the ICC profiles.

Figure 7:
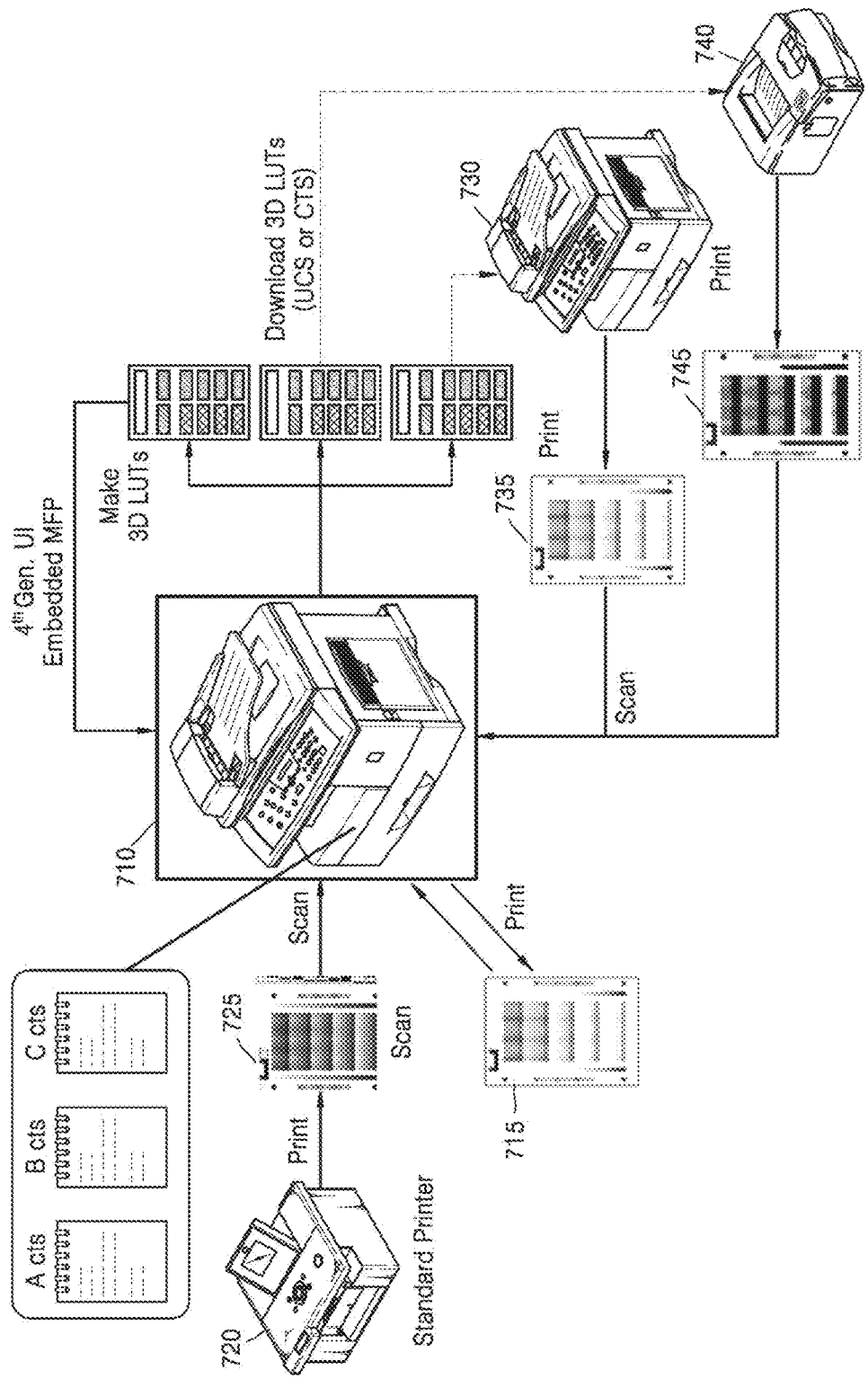
FIG. 7 is a diagram showing a color compensation method for a plurality of printers according to an embodiment of the present disclosure.

FIG. 7 is a diagram showing a color compensation method for a plurality of image forming apparatuses according to an embodiment of the present disclosure.

A method (color duplication) of applying a color of one reference printer to colors of a plurality of printers will be described with reference to FIG. 7. For example, when there are a plurality of printers, and any one of the plurality of printers is determined by a user as a reference, a color of the reference printer may be applied to the remaining printers.

The color compensation method using a reference color chart in one first image forming apparatus has been described in FIG. 5. In FIG. 7, a printout 725 imaged by a reference printer 720 may be the reference color chart. Also, there are a plurality of image forming apparatuses 730 and 740 in addition to a first image forming apparatus 710, and ICC profiles of the apparatuses may be collectively determined.

First, the reference printer 720 may image a reference color chart 725, and the image forming apparatuses 710, 730, and 740 on which color compensation is to be performed may output respective color charts. For example, a color chart output from image forming apparatus A 710 may be a first color chart 715, a color chart output from image forming apparatus B 730 may be a third color chart 735, and a color chart output from image forming apparatus C 740 may be a fourth color chart 745.

A scanner of an image forming apparatus may scan the reference color chart and the other color charts 715, 735, and 745.

The scanner may be combined with any one of the plurality of printers 710, 720, 730, and 740. That is, the scanner may be in the form of an MFP. Alternatively, the scanner may be separate from the plurality of printers 710, 720, 730, and 740.

However, when there are a plurality of scanners, for example, image forming apparatus A 710 is an MFP, and image forming apparatus B 730 is also an MFP, the scanning may be performed using only one of the plurality of scanners. This is because, when image forming apparatus A 710 scans the first color chart 715, and image forming apparatus B 730 scans the third color chart 735, the scanned color chart images may have unnecessary errors according to a unique quality or environment of each scanner.

This description assumes that only image forming apparatus A 710 includes a scanner as an MFP. Image forming apparatus A 710 may scan the first color chart 715, the reference color chart 725, the third color chart 735, and the fourth color chart 745 to acquire scanning image information.

A controller of image forming apparatus A 710 may analyze the scanned image information to determine a difference between colors in the color charts. The difference between colors of the reference color chart 725 and each of the other color charts may be determined and stored in a storage unit of image forming apparatus A 710.

Image forming apparatus A 710 may transmit ICC profiles suitable to the other image forming apparatuses 730 and 740 to the image forming apparatuses 730 and 740, and the image forming apparatuses may complete color compensation by applying the corrected ICC profiles.

Figure 8:
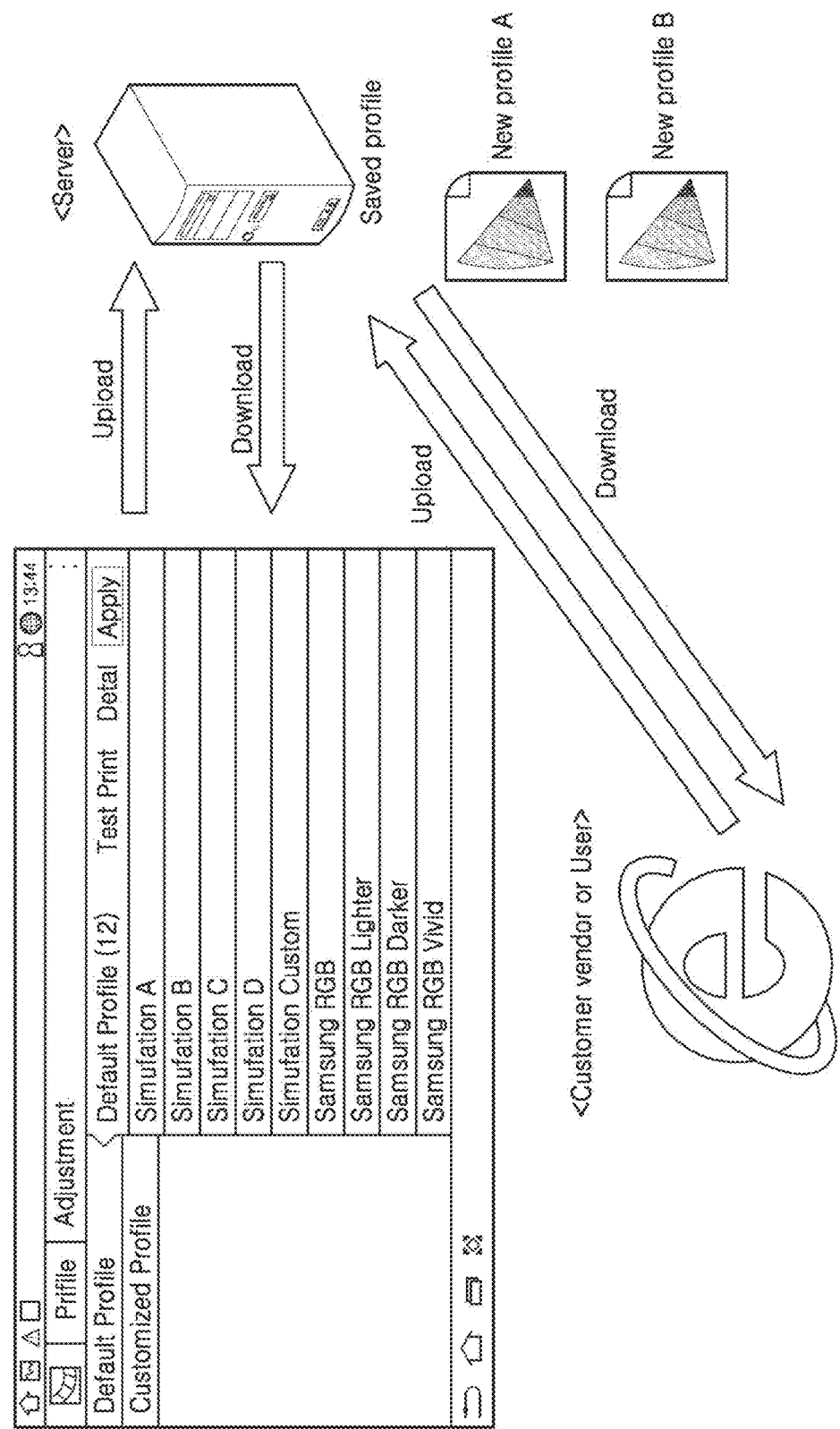
FIG. 8 is a diagram showing transmission of a profile through a server according to an embodiment of the present disclosure.

FIG. 8 is a diagram showing transmission of a profile through a server according to an embodiment of the present disclosure.

As shown in FIG. 8, an ICC profile that is newly determined by an image forming apparatus may be transmitted or received through a network. For example, ICC profiles may be previously stored in a server, and a user may perform color compensation by accessing the server to apply a prestored ICC profile to the image forming apparatus.

The user may use an application program such as a smart color manager to access the server. When the user transmits a model of the image forming apparatus or relevant identification information, the user may receive an ICC profile matching thereto.

Alternatively, the user may directly select a desired ICC profile from the server with reference to an exemplary image. By displaying an image displayed upon applying on a display device such as a monitor for each ICC profile stored in the server, an opportunity for the user to select the ICC profile may be provided.

In addition, a manufacturer or the user of the image forming apparatus generates and store various profiles in the server, and thus users accessing the server may apply an ICC profile consistent with a condition to the image forming apparatus.

When the ICC profile is applied to the image forming apparatus, a printout having a uniform color may be provided to a plurality of users who use the image forming apparatus. However, the users may prefer different colors. Accordingly, the controller of the image forming apparatus may perform user-customized color compensation by matching an ICC profile for each of the users who use the image forming apparatus.

There may be various methods in which the image forming apparatus identifies the user. For example, the image forming apparatus may identify the user by receiving manipulation information from a computer or tablet connected by wire or wirelessly with the image forming apparatus. When the user logs in to a web mail on the computer, the image forming apparatus may receive log-in information to identify the user.

Alternatively, the image forming apparatus may identify the user by analyzing information (e.g., a file) to be output from the image forming apparatus. Upon receiving the information to be output, the image forming apparatus may identify the user by analyzing the output information. For example, the image forming apparatus may consider a final writer of a file ABC.doc to be output as the user.

Figure 9:
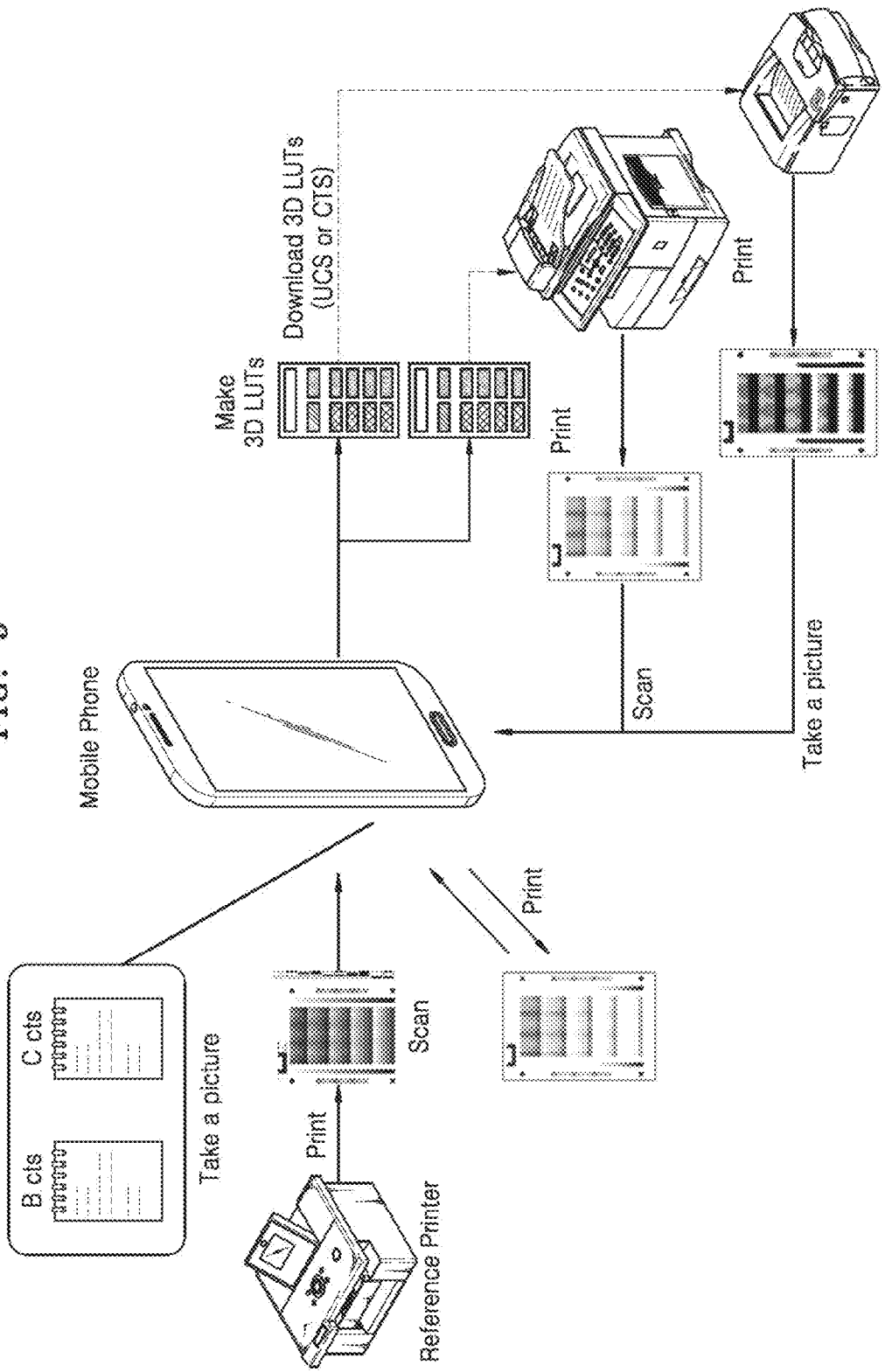
FIG. 9 is a diagram showing a color compensation method using a mobile device according to another embodiment of the present disclosure.

FIG. 9 is a diagram showing a color compensation method using a mobile device according to another embodiment of the present disclosure.

A user may perform color compensation by utilizing a mobile device such as a smartphone. When the smartphone is used, an intuitive user interface (UI) may be provided to the user through an application of the smartphone.

The smartphone of the user may be connected by wire or wirelessly with an image forming apparatus. For example, the smartphone and the image forming apparatus may be connected through a short-range communication network such as Bluetooth or near field communication (NFC) or connected by wire. The controller of the smartphone may determine a color difference by acquiring color charts imaged (printed) by image forming apparatuses.

Subsequently, the controller of the smartphone may transmit an ICC profile suitable to each image forming apparatus or selected by the user, and the image forming apparatus may perform color compensation by applying the ICC profile received from the smartphone.

In detail, first, the user may run an application program associated with the color compensation on the smartphone.

Subsequently, the smartphone may retrieve an image forming apparatus on which the color compensation is to be performed. In a method of retrieving an image forming apparatus from the smartphone, the smartphone may broadcast a discovery request packet and receive a discovery response packet from an image forming apparatus that receives the discovery request packet to retrieve image forming apparatuses.

The user may make selection from among the retrieved image forming apparatuses. The user may select one or more of the retrieved image forming apparatuses.

The application of the smartphone may connect to the image forming apparatus selected by the user and acquire output profile information of the image forming apparatus. The application of the smartphone may perform a color duplication function.

The user may retrieve image forming apparatuses and may select a preferred image forming apparatus as a reference image forming apparatus. The application of the smart phone may instruct that a color chart be transmitted to the selected reference image forming apparatus. The application of the smart phone may also instruct that a color chart be transmitted to an image forming apparatus that needs the color compensation.

Subsequently, the application of the smartphone may retrieve an image forming apparatus that supports a scanning function. The application of the smartphone may use the above-described information obtained by retrieving the image forming apparatuses to retrieve the image forming apparatus that supports the scanning function from the information or may separately perform a process of retrieving the image forming apparatus that supports the scanning function.

The application of the smartphone may provide a displayed UI such that the user selects the image forming apparatus that supports the scanning function.

The user may scan a reference color chart and a first color chart through the selected image forming apparatus that supports the scanning function. The reference color chart is a color chart that is output from the reference image forming apparatus, and the first color chart may be a color chart that is output from the image forming apparatus needing color compensation.

In this case, a mark that represents an output printer (or source) will be displayed together in the color charts, and the application of the smartphone may match the scanned color chart image information with the image forming apparatus on the basis of the mark.

As another method, the user may distinguish between the color charts by scanning the color charts in an order guided by the application of the smartphone.

When the image forming apparatus of the user is not an MFP, that is, the image forming apparatus does not include a scanner, the image forming apparatus may not use the above-described color compensation method. However, a user may usually have a mobile phone such as a smartphone and may capture an image by a built-in image sensor in the smartphone. Accordingly, the user may use the image sensor, that is, a camera of the smartphone, instead of the scanner, to acquire image information of the reference color chart and the first color chart.

The controller of the smartphone may acquire an RGB value of a certain position of a color chart on the basis the color chart image information and may transform the acquired RGB value into the HSV color coordinate system. The controller of the smartphone may compare an HSV value of the image forming apparatus needing the color compensation and an HSV value of the reference image forming apparatus to determine a color difference. The controller of the smartphone may generate a LUT that compensates for a difference on the HSV color coordinate system in consideration of the determined color difference.

The controller of the smartphone may use the color difference compensation LUT to generate color information of R'G'B' and may use an RGB to CMYK interpolation scheme stored in the image forming apparatus to generate an RGB to C'M'Y'K' profile. The image forming apparatus may store the profile and output the stored profile in a color similar to an output color of the reference printer.

Here, the RGB to CMYK table is a value that may be seen in a process of manufacturing the image forming apparatus, and may be information previously acquired through the application of the smartphone.

Figure 10:
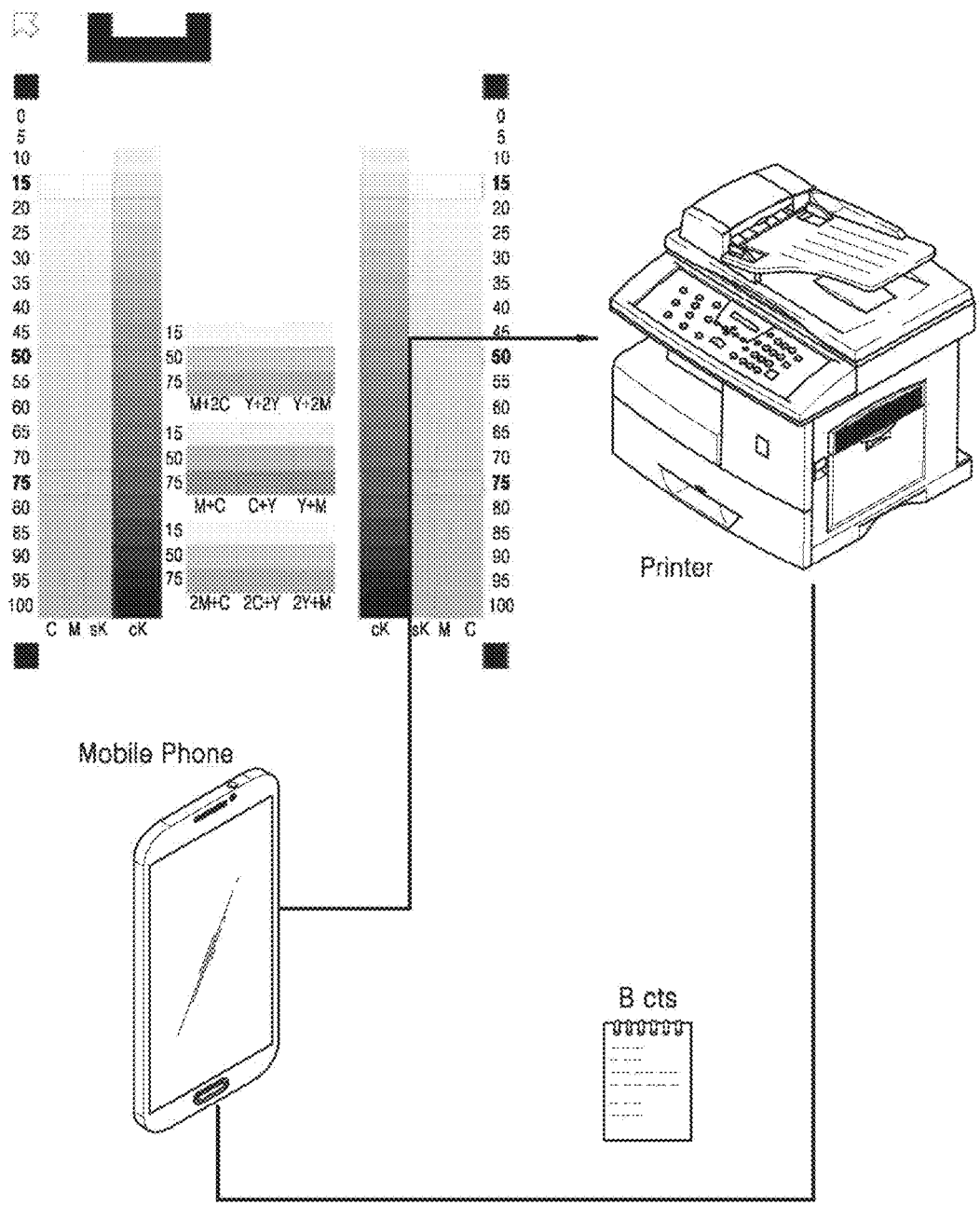
FIG. 10 is a diagram showing a color compensation method between a mobile device and an image forming apparatus according to another embodiment of the present disclosure.

FIG. 10 is a diagram showing a color compensation method between a smartphone and an image forming apparatus according to another embodiment of the present disclosure.

As shown in FIG. 10, color may be calibrated using a smartphone, that is, through an application of the smartphone.

An image forming apparatus to be calibrated may be retrieved using the smartphone. In this case, it may be determined whether the image forming apparatus retrieved using the smartphone includes a self-scanning function, that is, is an MFP with which a scanner is combined. It may be determined whether the scanner is included by using the information of the image forming apparatus received through the smartphone.

When an image forming apparatus to be calibrated is selected by the user, the application of the smartphone may connect by wire or wirelessly to the image forming apparatus selected by the user to acquire output profile information of the image forming apparatus. As described above, the number of image forming apparatuses to be calibrated may be one. Alternatively, it will be appreciated that the number of image forming apparatuses is two or more.

Here, the application program of the smart phone may perform color calibration. The application program of the smartphone may send a compensation chart to a printer to be calibrated. The application program of the smartphone may provide an image forming apparatus that supports a scanning function to the user through a display of the smartphone, and the user may scan the compensation chart using a scanner of the image forming apparatus selected by the user.

When the scanner is not included, as in FIG. 9, the application program of the smartphone may acquire image information of the compensation chart by capturing the compensation chart using a camera unit of the smartphone.

The controller of the smart phone may analyze the captured compensation chart image to acquire an RGB value of a specific position and determine a current state of an engine of the image forming apparatus.

The controller of the smartphone may generate a reference gamma table used to correct a dither table on the basis of the determined current time of the engine.

The controller of the smartphone may control the generated reference gamma table to be transmitted to a printer to be calibrated. The controller of the smartphone may transmit a calibration command to an image forming apparatus that receives the reference gamma table.

Upon receiving a calibration command from the image forming apparatus that receives the reference gamma table, the controller of the smartphone may output a color pattern to check a toner density of the engine and measure a value of the color pattern through an installed sensor.

The image forming apparatus may correct an output concentration of the dither table with reference to the value measured by a toner density sensor and the reference gamma table. The calibration work may periodically perform compensation on the basis of reference gamma such that a color desired by the user does not change longitudinally, thus maintaining color that was initially set in the image forming apparatus.

Figure 11:
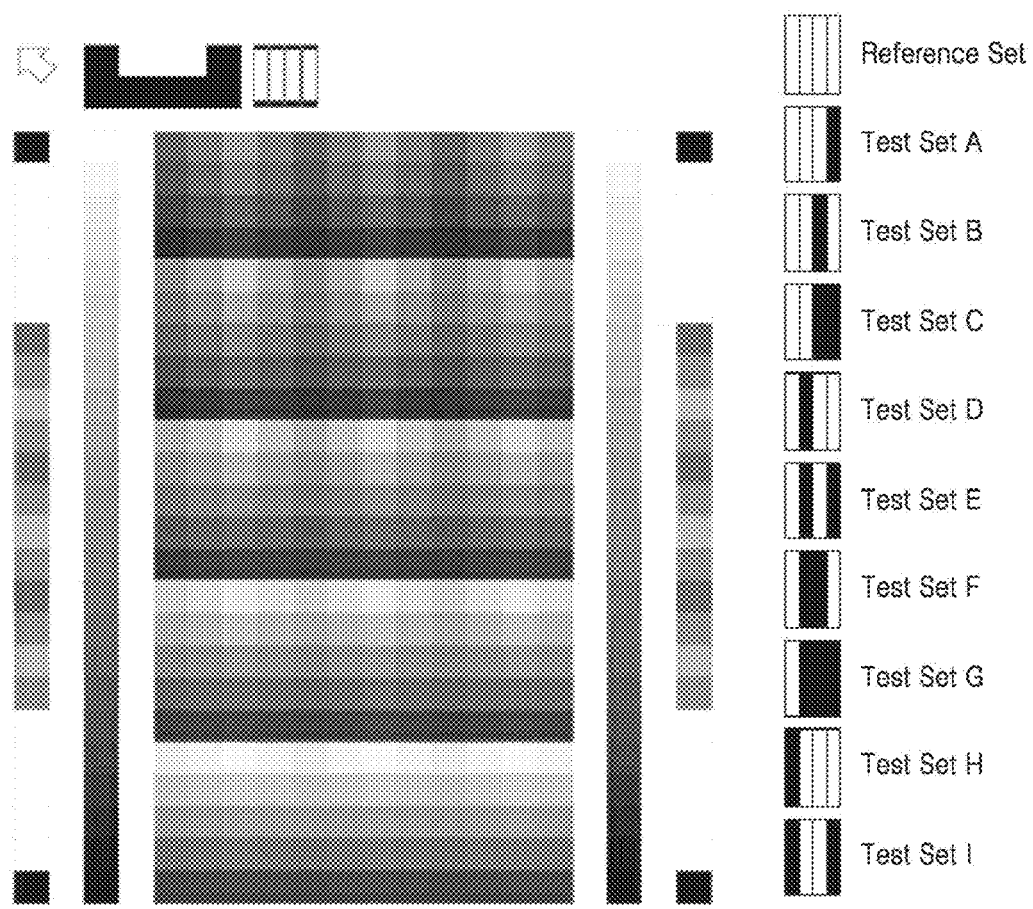
FIG. 11 is a diagram showing an example of a compensation chart according to an embodiment of the present disclosure.

FIG. 11 is a diagram showing an example of a compensation chart according to an embodiment of the present disclosure.

As shown in FIG. 11, a compensation chart used for calibration may represent various colors using various degrees of chroma and brightness, and the colors may be arranged in various ways. Since the analysis of the entirety of colors in the compensation chart is a burden to a controller, the controller may perform comparison on only a portion of the compensation chart to enhance a processing speed.

For example, a total of ten test sets such as a range of test set A to test set I are displayed at a right side of FIG. 11. It is apparent that this is a pattern for comparing specific parts in the entire compensation chart, and a load and a processing time increase as the compared parts are great.

Figure 12:
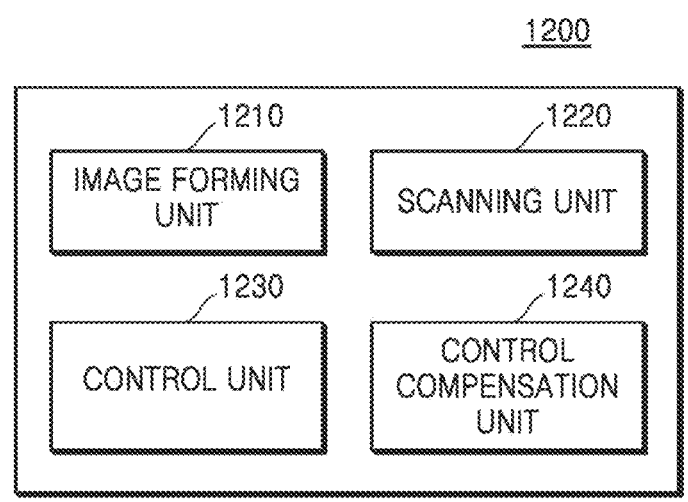
FIG. 12 is a block diagram showing a structure of an image forming apparatus according to an embodiment of the present disclosure.

FIG. 12 is a block diagram showing a structure of an image forming apparatus according to an embodiment of the present disclosure.

An image forming apparatus 1200 according to an embodiment of the present disclosure may include an image forming unit 1210, a scanning unit 1220, a control unit 1230, and a color compensation unit 1240.

The image forming unit 1210 according to an embodiment of the present disclosure may output information for which an output command has been received as image information. For example, the image forming unit 1210 may output text onto an A4 sheet or may output an image file.

The scanning unit 1220 according to an embodiment of the present disclosure serves to transform a printout to be scanned back into an image file processable by a computer. The scanning unit 1220 serves to scan a hardcopy printout to transform the printout into a file format such as jpg or pdf.

The control unit 1230 according to an embodiment of the present disclosure may control information input to and/or output from other components 1210, 1220, and 1240 of the image forming apparatus 1200. For example, the control unit 1230 according to an embodiment of the present disclosure may control the image forming unit 1210 to smoothly perform imaging, may control the scanning unit 1220 to perform image scanning, and may control information needed for color compensation to be performed by the color compensation unit 1240.

The control unit 1230 according to an embodiment of the present disclosure may compare a reference color chart and a first color chart to determine a color difference and may determine an ICC profile for applying the color difference to the image forming apparatus 1200 as a compensation value.

A method of the control unit 1230 determining an ICC profile may include primarily removing an ICC profile having a color difference that is outside a certain range and determining an ICC profile that is the most similar to a color of the reference color chart from among filtered ICC profiles.

The color compensation unit 1240 according to an embodiment of the present disclosure serves to compensate for an output color of the image forming apparatus 1200 on the basis of the ICC profile determined by the control unit 1230. Also, the color compensation unit 1240 may perform control such that color is kept uniform according to a period and a color compensation method determined internally by the image forming apparatus 1200 in addition to the ICC profile determined by the control unit 1230.

Figure 13:
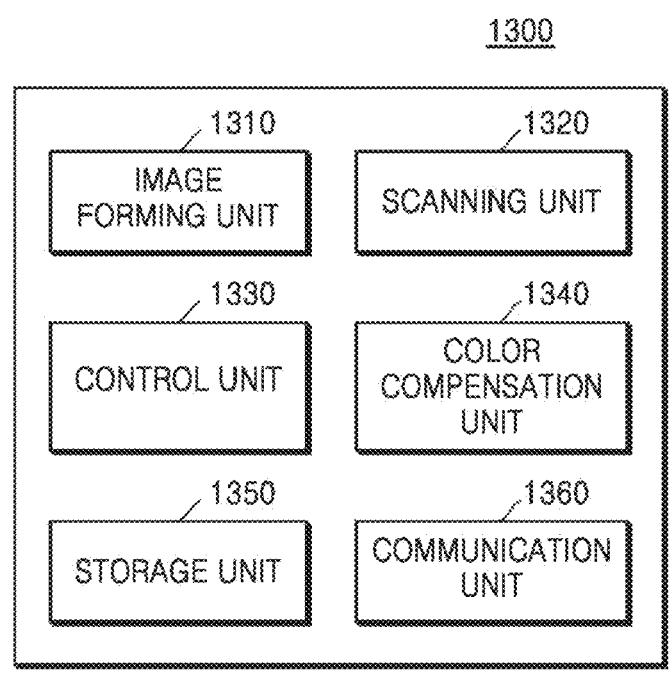
FIG. 13 is a block diagram showing another structure of an image forming apparatus according to an embodiment of the present disclosure.

FIG. 13 is a block diagram showing another structure of an image forming apparatus according to an embodiment of the present disclosure.

An image forming apparatus 1300 may further include a storage unit 1350 and a communication unit 1360 in addition to an image forming unit 1310, a scanning unit 1320, a control unit 1330, and a color compensation unit 1340.

The image forming unit 1310, the scanning unit 1320, the control unit 1330, and the color compensation unit 1340 according to an embodiment of the present disclosure have been described above and thus the detailed description thereof will be omitted.

The storage unit 1350 according to an embodiment of the present disclosure may store data processed inside or outside the image forming apparatus 1300. In an embodiment of the present disclosure, the storage unit 1350 of the image forming apparatus 1300 may store packet data received in the image forming apparatus 1300. Also, the storage unit 1350 may store information determined by the control unit 1330 as a color difference and may store a plurality of ICC profiles. The storage unit 1350 may store information received from a server, etc.

The communication unit 1360 according to an embodiment of the present disclosure may perform communication between image forming apparatuses or between an image forming apparatus and a device. In an embodiment of the present disclosure, the communication unit 1360 of the image forming apparatus 1300 may perform wireless communication such as Bluetooth, NFC, Wi-Fi, etc. other than wired communication. The communication unit 1360 of the image forming apparatus 1300 may broadcast an advertising packet and may receive a connection request message from a device and image forming apparatus that has received the packet. Also, the communication unit 1360 may perform communication with an external device in an appropriate communication scheme during a process of establishing a session and a method of performing a service.

Figure 14:
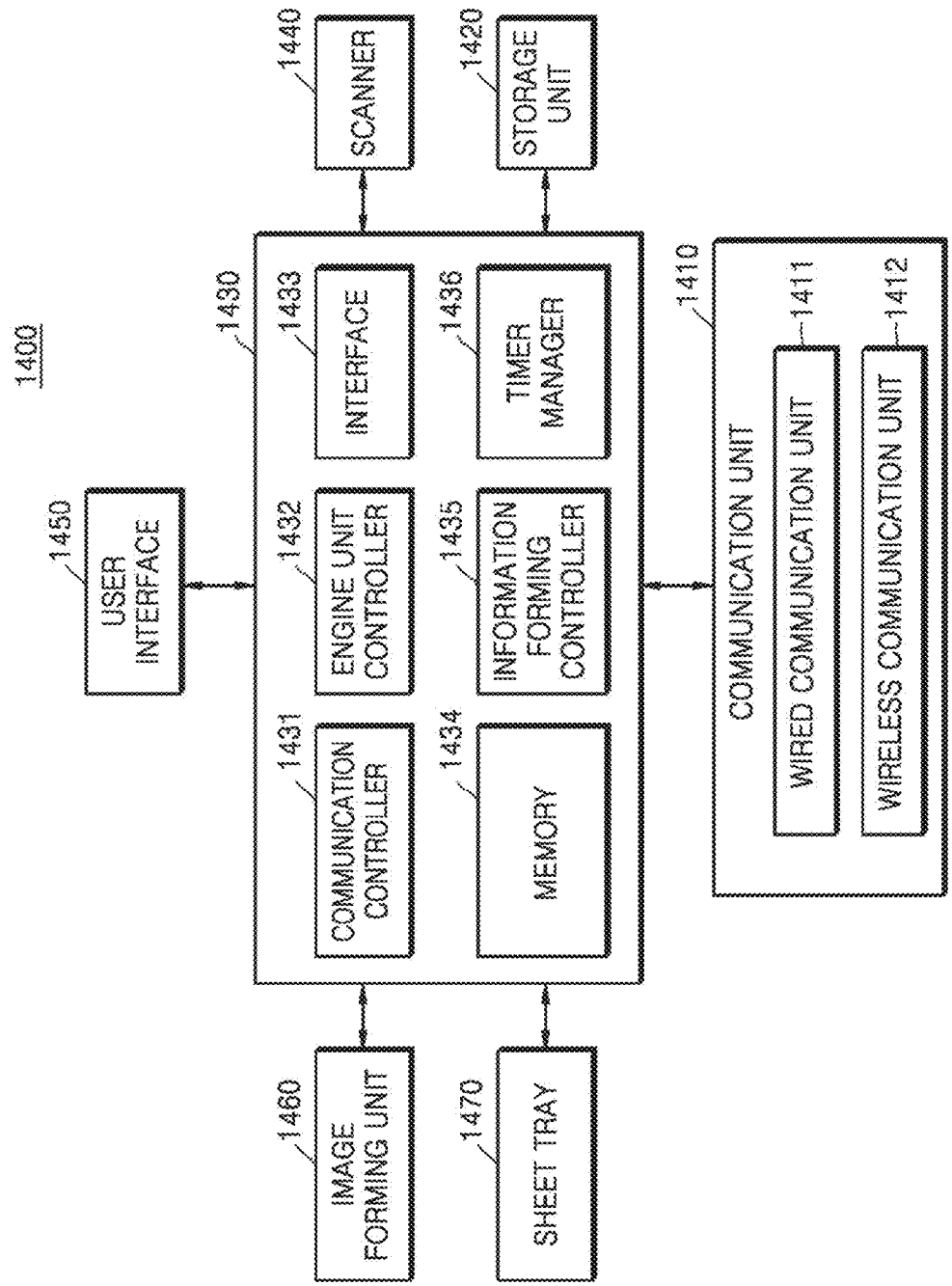
FIG. 14 is a block diagram showing a structure of a multifunction peripheral according to an embodiment of the present disclosure.

FIG. 14 is a block diagram showing a structure of an MFP according to an embodiment of the present disclosure.

An image forming apparatus 1400 according to an embodiment of the present disclosure may include a communication unit 1410, a storage unit 1420, a control unit 1430, a scanner 1440, a user interface 1450, an image forming unit 1460, and a sheet tray 1470.

The communication unit 1410 according to an embodiment of the present disclosure may include a wired communication unit 1411 and a wireless communication unit 1412. A network applied to the wired communication unit 1411 and the wireless communication unit 1412 according to the disclosure includes a local area network (LAN), a wide area network (WAN), a value added network (VAN), a mobile radio communication network, a satellite communication network, or a combination thereof. The network may indicate a general-concept data communication network that allows network parties to perform communication with one another without any problem and may include a wired Internet, a wireless Internet, and a mobile wireless communication network.

The communication unit 1410 according to an embodiment of the present disclosure may include a short-range wireless communication unit, a mobile communication unit, a broadcast receiving unit, or the like. The short-range wireless communication unit may include, but is not limited to, a Bluetooth communication unit, a Bluetooth low energy (BLE) communication unit, an NFC unit (NFC/RFID), a wireless LAN (WLAN) communication unit, a Zigbee communication unit, an Infrared Data Association (IrDA) communication unit, a Wi-Fi Direct (WFD) communication unit, an ultra wideband (UWB) communication unit, and an Ant+ communication unit.

The storage unit 1420 according to an embodiment of the present disclosure may store a program for processing and controlling the control unit 1430 and may also store input/output data (e.g., service identification information, company identification information, etc., which are predetermined as filtered information). The storage unit 1420 may include a flash memory type, hard disk type, multimedia card micro type, or card type memory (e.g., an SD or XD memory), or at least one type of storage medium of a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc.

The control unit 1430 according to an embodiment of the present disclosure may include a communication controller 1431, an engine unit controller 1432, an interface 1433, a memory 1434, an image forming controller 1435, a timer manager 1436, etc.

The communication controller 1431 according to an embodiment of the present disclosure may perform control such that communication is smoothly performed by the communication unit 1410, and the engine unit controller 1432 may control an operation of an engine unit of the image forming apparatus 1400. The interface 1433 may control connection and data input/output with a peripheral or modules internally or externally connected with the image forming apparatus 1400. The memory 1434 may temporally or permanently store information regarding various operations and data processed by the control unit 1430. The image forming controller 1435 may control a task in which an image is formed by an image forming unit 1460. The timer manager 1436 may manage times of various operations processed by the image forming apparatus 1400.

The image forming unit 1460 according to an embodiment of the present disclosure performs a task in which an image is actually formed. For example, the image forming unit 1460 may perform a task of printing input image data on a sheet.

The sheet tray 1470 according to an embodiment of the present disclosure may server to supply a sheet to the image forming apparatus 1400.

Figure 15:
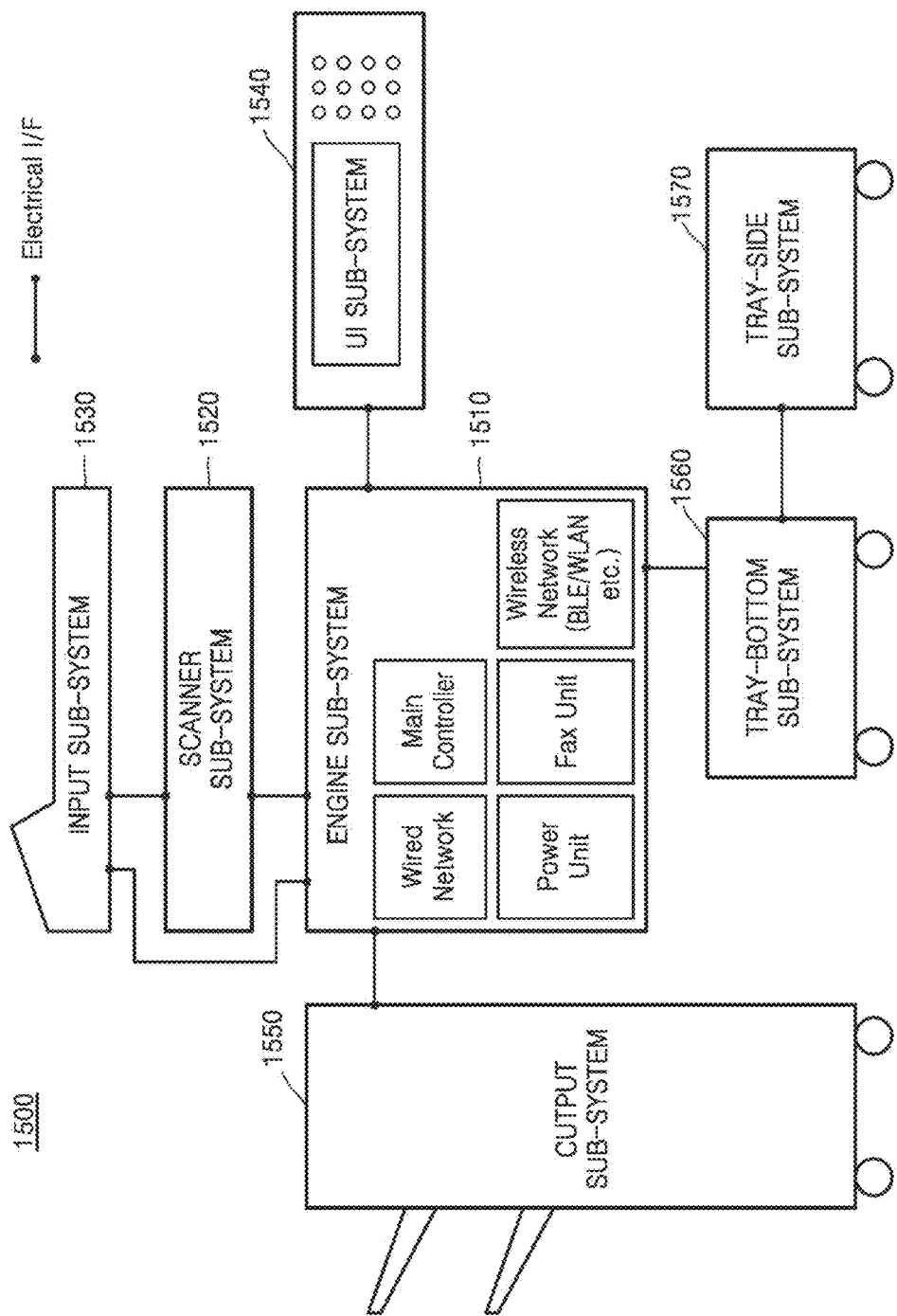
FIG. 15 is a block diagram showing another structure of a multifunction peripheral according to an embodiment of the present disclosure.

FIG. 15 is a block diagram showing another structure of an MFP according to an embodiment of the present disclosure.

An image forming apparatus 1500 according to an embodiment of the present disclosure may include an engine subsystem 1510, a scanner subsystem 1520, an input subsystem 1530, a UI subsystem 1540, an output subsystem 1550, a tray-bottom subsystem 1560, a tray-side subsystem 1570, etc.

The engine subsystem 1510 according to an embodiment of the present disclosure may perform the above-described operations in the image forming apparatus 1500. The engine subsystem 1510 may include a wired network module or wireless network module and may include a main controller, a power unit, a fax unit, etc.

The engine subsystem 1510 may include a frame, a paper input, LSU/LPH, an imaging unit, a fuser, a controller, a power unit, etc., for the purpose of charging, exposure, developing, cleaning, erasing, and fusing.

The scanner subsystem 1520 according to an embodiment of the present disclosure may support the image forming apparatus 1500 to perform a scanning task. The input subsystem 1530 may also scan a sheet image input to a scan plate. The input subsystem 1530 may support an original image or original sheet to be input to the scanner subsystem 1520 for the purpose of a task such as copying, scanning, and faxing.

The UI subsystem 1540 according to an embodiment of the present disclosure may display a GUI screen. Also, the UI subsystem 1540 according to an embodiment of the present disclosure may include an LCD panel in order to receive a manipulation command from a user and may include a touch screen or a hard button. The UI subsystem 1540 may be displayed in the form of a widget and may receive a user input.

The output subsystem 1550 according to an embodiment of the present disclosure may allow a printout imaged by the image forming apparatus 1500 to be output and may include a roller, etc. The output subsystem 1550 may be a system, such as a standard finisher and a booklet finisher, for post-processing a printed sheet. The tray bottom subsystem 1560 and the tray side subsystem 1570 may serve to keep sheets (e.g., A4, A3, and B5) and supply the sheets upon image-forming.

A process of sequentially forming an image by the image forming apparatus 1500 according to an embodiment of the present disclosure will be described below. First, a sheet may be stored in the tray bottom system 1560 and the tray side system 1570. When an original image on which a copy task is to be performed is input to the input subsystem 1530 by the user and when a copy task command of the user is input to the UI subsystem 1540 (e.g., ten output A4 sheets), the scanner subsystem 1520 may scan the original image. For example, the engine subsystem 1510 may manage all tasks and image the scanned data. Subsequently, the user may acquire the image printout through the output subsystem 1550.

Some embodiments may be implemented as a recording medium including computer-executable instructions such as a computer-executable program module. A computer-readable medium may be any usable medium accessible by a computer and may include volatile and non-volatile media and discrete and integrated media. Also, the computer-readable medium may include both a computer storage medium and a communication medium. The computer storage medium includes the volatile and non-volatile media and the discrete and integrated media, which are implemented in any method or technique for storing information such as a computer readable instruction, data structure, program module, or other data. The communication module typically includes the computer readable instruction, data structure, program module, or other data and transmission mechanism of a modulated data signal such as a carrier and further includes any information transmission medium.

In this disclosure, the term "unit" may denote a hardware component such as a processor or circuit or a software component executed by the hardware component such as a processor.

The above description is merely illustrative, and it will be understood by those skilled in the art that various changes in form and details may be made therein without departing from the spirit and scope of the disclosure as defined by the appended claims. The above embodiments are accordingly to be regarded as illustrative rather than restrictive. For example, while a single element may be distributed and then carried out, distributed elements may be carried out in a combination thereof.

Therefore, the scope of the disclosure is defined not by the detailed description of the disclosure but by the appended claims, and a variety of embodiments within the scope will be construed as being included in the present disclosure.

What is claimed is:

1. A color compensation method performed for a first image forming apparatus, the method comprising:
   generating a color chart on a first printing medium using a first image former included in the first image forming apparatus;
   scanning, by a scanner, the color chart on the first printing medium to generate a first scanned color chart;
   obtaining a second scanned reference color chart by a scan, by the scanner, of a reference color chart generated on a second printing medium, the reference color chart generated on the second printing medium using a second image former included in a second image forming apparatus distinct from the first image forming apparatus and being a reference for determining a profile of the first image forming apparatus;
   determining the profile of the first image forming apparatus by comparing the first scanned color chart and the second scanned reference color chart; and
   performing color compensation for the first image former included in the first image forming apparatus based on the determined profile.

2. The color compensation method of claim 1, wherein the reference color chart is a predefined color chart that is selected by a user of the first image forming apparatus.

3. The color compensation method of claim 1, wherein the determined profile comprises an international color consortium (ICC) profile.

4. The color compensation method of claim 1, wherein information regarding the second scanned reference color chart includes information obtained by the scanner of the first image forming apparatus scanning the reference color chart.

5. The color compensation method of claim 1, wherein the comparing of the first scanned color chart and the second scanned reference color chart comprises comparing an attribute of the first scanned color chart and an attribute of the second scanned reference color chart.

6. The color compensation method of claim 5, wherein the attribute of the first scanned color chart and the attribute of the second scanned reference color chart include one or more of tone, chroma, and/or brightness.

7. The color compensation method of claim 1, wherein the comparing of the first scanned color chart and the second scanned reference color chart comprises:
   transforming RGB values of the first scanned color chart and the second scanned reference color chart at a predefined position into a different color coordinate system; and
   performing color information comparison on the color coordinate system.

8. The color compensation method of claim 3, wherein the determining of the ICC profile comprises:
   removing an ICC profile that is outside of a predetermined range from among a plurality of prestored ICC profiles; and determining an ICC profile having an attribute that is within a certain range with respect to the reference color chart.

9. An image forming apparatus comprising:
an image former;
at least one computer storage medium storing computer-executable instructions; and
at least one hardware processor to execute the stored computer-executable instructions to cause:
  generating a color chart on a first printing medium using the image former;
  scanning, by a scanner, the color chart on the first printing medium to generate a first scanned color chart;
  obtaining a second scanned reference color chart by a scan, by the scanner, of a reference color chart generated on a second printing medium, the reference color chart being imaged on the second printing medium using another image former included in another image forming apparatus distinct from the image forming apparatus and being a reference for determining a profile of the image forming apparatus;
  determining the profile of the image forming apparatus by comparing the first scanned color chart and the second scanned reference color chart; and
  performing color compensation for the image former of the image forming apparatus based on the determined profile.

10. The image forming apparatus of claim 9, wherein the reference color chart is a predefined color chart that is selected by a user of the image forming apparatus.

11. The image forming apparatus of claim 9, wherein the determined profile comprises an international color consortium (ICC) profile.

12. The image forming apparatus of claim 9, wherein information regarding the second scanned reference color chart includes information obtained by the image forming apparatus scanning the reference color chart.

13. The image forming apparatus of claim 9, wherein, when comparing the first scanned color chart and the second scanned reference color chart, the at least one hardware processor compares an attribute of the first scanned color chart and an attribute of the second scanned reference color chart.

14. The image forming apparatus of claim 13, wherein the attribute of the first scanned color chart and the attribute of the second scanned reference color chart include one or more of tone, chroma, and brightness.

15. The image forming apparatus of claim 9, wherein, when comparing the first scanned color chart and the second scanned reference color chart, the at least one hardware processor transforms RGB values of the first scanned color chart and the second scanned reference color chart at a predefined position into another color coordinate system and performs color information comparison on the transformed color coordinate system.

16. The image forming apparatus of claim 11, wherein the at least one hardware processor is to remove an ICC profile that is outside of a predetermined range from among a plurality of prestored ICC profiles and then determines an ICC profile having an attribute that is within a certain range with respect to the reference color chart.

* * * * *